3,003,193
METHOD FOR MAKING BEADS OF
THERMOPLASTIC POLYMERS
Douglas S. Chisholm and Harold R. Bylsma, Midland, Mich., assignors to The Dow Chemical Company, Midland, Mich., a corporation of Delaware
Filed Jan. 15, 1959, Ser. No. 787,072
20 Claims. (Cl. 18—55)

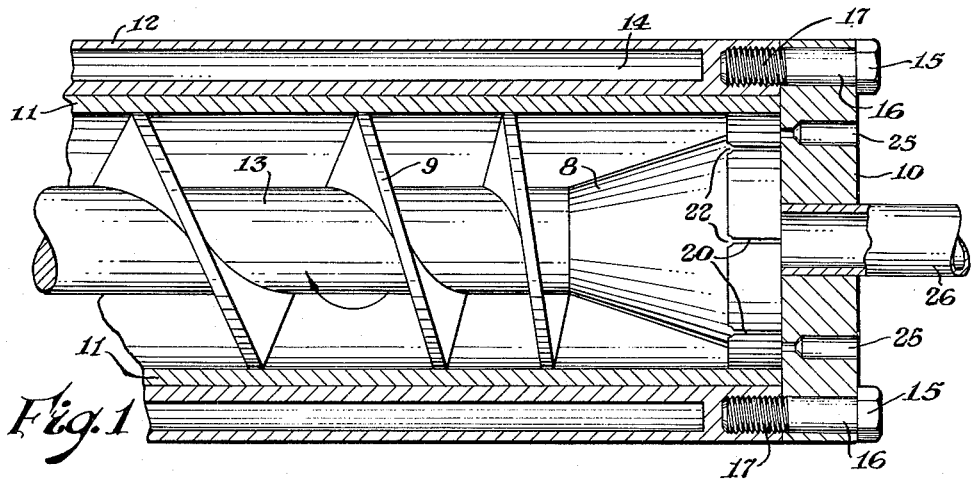
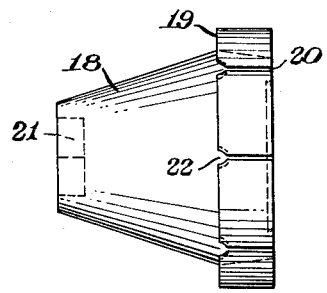 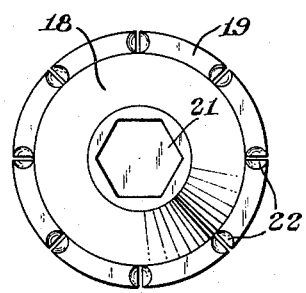 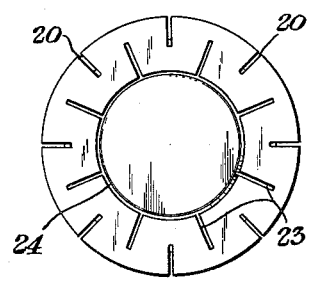
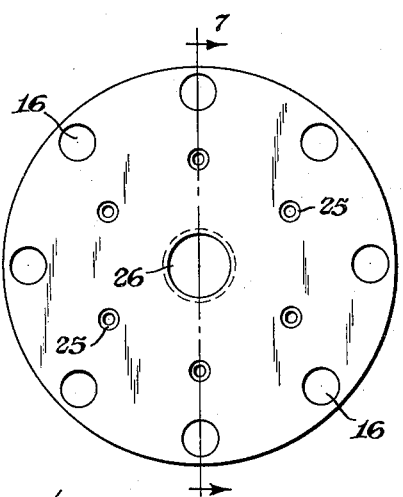 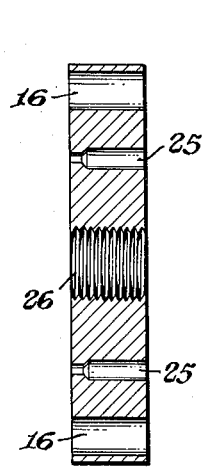 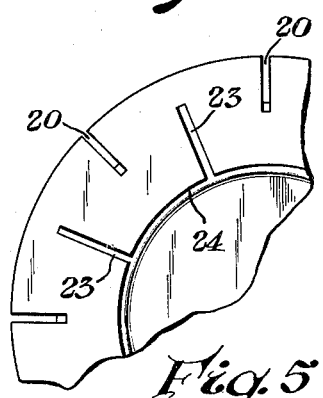
INVENTORS.
Douglas S. Chisholm
Harold R. Bylsma
BY Griswold & Burdick
ATTORNEYS United States Patent Office 3,003,193
Patented Oct. 10, 1961

This invention concerns a method for making beads of thermoplastic substances. It relates more particularly to a method of making molding granules of normally solid thermoplastic polymers and polymer compositions in the form of discrete free-flowing beads.

Thermoplastic substances such as polymers of vinyl and vinylidene compounds are commonly supplied as molding powders or granules in finely divided, broken or particulate form, and various means such as grinding, crushing or by extruding the heat-plastified polymer or polymeric composition as a web, sheet, strand or a plurality of strands which is cooled and cut or broken to a particulate form suitable for molding, have been used to make molding powder or granules from such polymers.

The methods heretofore employed for making molding granules of thermoplastic polymers have the disadvantage that the sizes of the particles often range from fine powder to coarse granules and requires that the crushed or broken polymer be screened to obtain granules of substantially the same size, suitable for molding. Even when the heat-plastified polymer is extruded as a web or a plurality of strands, then is cooled and cut or broken to a granular form, a considerable proportion of fines are obtained and the granules are of irregular shapes and sizes and are less suitable for molding purposes than is desired. The use of irregular shaped granules of a mixture of such granules of different sizes, increases the difficulties of maintaining a uniform feed of the material to injection molding machines or plastics extruders and renders it difficult to obtain a uniform charge of the material in compression-type molds or other molds of a given volume, and results or causes variation in the density or quality of the molded articles.

Accordingly, it is a primary object of the invention to provide a method for making beads of thermoplastic substances. Another object is to provide a method of making molding granules of normally solid thermoplastic polymers of vinyl or vinylidene compounds and compositions comprising such thermoplastic polymers in the form of free-flowing beads of uniform or substantially uniform size. Still another object is to provide a method of making beads of normally solid resinous polymers of vinylidene aromatic compounds. A specific object is to provide a method of making molding granules of normally solid thermoplastic alkenyl aromatic polymers and compositions comprising such polymers in the form of free flowing beads of uniform or substantially uniform size. Other and related objects may appear as the description of the invention proceeds.

According to the invention, beads of thermoplastic substances such as synthetic polymers of organic vinyl and vinylidene compounds, i.e. normally solid polymers and compositions comprising such polymers, can readily be prepared by a procedure which consists in supplying a heat-plastified or heat-softened normally solid composition comprising a thermoplastic vinylidene polymer under a continuously applied pressure to an extrusion zone wherein it is pressed into constricted passageways under the applied pressure and is advanced into a zone of lower pressure, then is cut into discrete globules or portions of the extruded plastic material, which globules are almost immediately contacted with a flow of a fluid under pressure which fluid is non-reacting and immiscible with the plastic material and is at a temperature above the boiling point of the fluid at atmospheric pressure, and which flow of the fluid advances the globules of the plastics material into a zone of sufficiently lower pressure to cause boiling or vaporization of at least a portion of the fluid, whereby the globules of the plastic material are rapidly cooled to the solid state.

The invention comprises in combination the supplying of a normally solid thermoplastic polymer or polymer composition in a heat-plastified flowable condition under a continuously applied pressure to an extrusion die comprising in combination a die member or die cutter having a plurality of constricted passageways therethrough and on its discharge face a plurality of shallow grooves between and not connecting with said constricted passageways, and a discharge member having a plurality of outlets therein leading to a zone of lower pressure and an inlet therein leading to said grooves in the face of said die cutter, said die cutter and said discharge member being rotatable with respect to, and positioned adjacent to, one another, with running clearance therebetween, and said constricted passageways and said grooves in said die cutter being adapted to be alternately brought in register with the outlets in said discharge member as said die cutter and said discharge member rotate with respect to one another and the supplying of a fluid which is non-reacting and immiscible with the plastic, under pressure to the inlet in the discharge member, and extruding the heat-plastified plastic material through the extrusion die while rotating the die cutter and/or the discharge member with respect to one another, whereby the plastic is extruded and cut into discrete portions which are cooled and ejected from the extrusion die as solid granules in the form of free-flowing beads.

The invention is described more particularly with reference to the accompanying drawing wherein:

FIG. 1 is a longitudinal section through part of the barrel of a standard plastics extruder showing the essential elements of an arrangement of apparatus suitable for practice of the invention.

FIG. 2 is a side view of the die member or die cutter in elevation.

FIG. 3 is an end view of the die cutter showing means of rotating the die cutter with the screw of a plastics extruder.

FIG. 4 is an end view of the discharge face of the die cutter showing the constricted passageways and the grooves therein.

FIG. 5 is an enlarged view of a portion of the discharge face of the die cutter showing in greater detail the constricted passageways and the grooves in the die cutter.

FIG. 6 is an end view of the face of the discharge member, and

FIG. 7 is a cross-sectional view of the discharge member taken along the lines 7—7 of FIG. 6.

The essential elements of an extrusion die suitable for practice of the invention comprises in combination the die cutter having the constricted passageways therethrough and the grooves therein, between and non-connecting with the passageways, and the discharge member having outlets and an inlet therein, said members being coaxial and rotatable with relation to one another, with running clearance therebetween, in a manner such that the constricted passageways and the grooves in the die cutter are alternately brought in register with the outlets in the discharge member as said die cutter and said discharge member rotate with relation to one another and means for supplying a flow of a fluid into the grooves in said die cutter, which is shown in one typical conformation in the cylindrical barrel of a standard, usually horizontal, extrusion machine in FIG. 1.

In the drawing, the die cutter 8 is interposed as a coaxial extension of the feed screw 9, between the end of the screw and the discharge member 10, in the cylindrical barrel 11 of a standard, usually horizontal, extrusion machine 12. Screw 9, usually, but not necessarily, has a root 13, at least half the diameter of the barrel 11 and is ordinarily of the compression type, with a diminishing lead on the successive flights of the screw. Typically the barrel 11 is surrounded by chamber 14 for heating or cooling as required. Advantageously, a mixing torpedo for plastics extruders (not shown) similar to that described in U.S. Patent No. 2,543,088, can be interposed as a coaxial extension of the feed screw 9 and between the die cutter 8, with suitable modification of the end of the mixing torpedo to connect and turn the die cutter 8 as a coaxial extension thereof, but such mixing torpedo is not required. Beyond die cutter 8 in the extrusion path and adjacent thereto is the discharge member 10 with running clearance therebetween. Typically, the discharge member 10 can be a plate held in place across the discharge end of the barrel 11 of the extruder 12 by means of bolts 15 which may be inserted or withdrawn through bolt holes 16 and tapped sockets 17.

The essential features of the die cutter employed as a coaxial extension of a feed screw in the cylindrical barrel of a plastics extruder which is shown in FIG. 1 are shown in greater detail in FIGS. 2, 3, 4 and 5.

The body 18 of the die cutter 8 is suitably in the form of a frustrum of a cone of a diameter of from one-half to three-quarters the diameter of the barrel 11, the frustrum of the cone-shaped body 18 matching the diameter of the root 13 of the screw 9 and tapering outward in the extrusion path to a base enough smaller than the diameter of the barrel 11 to allow for a rim 19 sufficiently smaller than the bore of the barrel 11 to leave running clearance of from about 0.010 to 0.020 inch between the rim 19 of the die cutter 8 and the barrel 11 and which rim is enough larger than the base of the body to permit providing a plurality of constricted passageways 20, e.g. drill holes or peripheral slots, therein for flow of the plastic material through the die cutter 8. The die cutter 8 is provided with a socket 21, e.g. a square or hexagonal socket, preferably making a slip fit with a stud of corresponding cross-sectional configuration on the end of the feed screw 9 to turn the die cutter 8 when the screw is rotated. It is advantageous to turn the die cutter 8 by means of a slip-fitted stud and socket connection with the end of the feed screw 9 so that pressure of the advancing plastic against the die cutter 8 maintains the face of said cutter flush with or parallel against the discharge member 10. The body of the die cutter can be a tapered frustrum of a cone to furnish a smooth approach over which plastic material may be forwarded as it leaves the screw 9 or a tapered shoulder to provide a smooth approach over which the plastic material is advanced into the constricted passageways 20 in the rim 19 of the die cutter 8. The constricted passageways 20 can be drill holes or slots and of any cross-sectional configuration, e.g. round, square, oblong, etc., but are preferably peripheral slots equally spaced around the rim 19 of the die cutter 8 and with tapered shoulders 22 to provide a smooth approach for flow of plastic into the slots. As shown in FIG. 4 the discharge face of the die cutter 8 contains a plurality of radially disposed grooves 23 extending between each of the peripheral slots 20 but not connecting therewith. The grooves 20 are suitably of a width and depth which is the same as the width of the slots 20, but grooves of other dimensions can be used. The grooves 23 connect with an annular groove 24 in the face of the die cutter 8, which groove 24 can be of any suitable dimensions, e.g. of a width and depth of from about 0.010 to 0.25 inch or larger. The annular groove 24 in the face of the die cutter 8 forms with the discharge member 10, shown in FIG. 6, a reservoir or chamber for feed of a fluid into the grooves 23 when the die cutter 8 and the discharge member 10 are positioned adjacent to one another with running clearance therebetween.

The arrangement of the peripheral slots 20, the radially disposed grooves 23 and the annular groove 24 is shown in greater detail in the enlarged view of a portion of the discharge face of the die cutter 8 in FIG. 5.

The discharge member 10 consists of a plate larger in diameter than the bore of the barrel 11 and is held in place across the extrusion path of the plastics material by bolts 15 which can be inserted or withdrawn through bolt holes 16. The discharge member 10 is provided with a plurality of outlets 25 such as drill holes or openings of other cross-sectional configuration, e.g. square, oblong, hexagonal, etc., but drill holes or tapered drill holes are preferred. The outlets are preferably a plurality of equally spaced tapered drill holes on a circle having a diameter the same as that of a circle which encompasses both a portion of the peripheral slots 20, such as the bottoms of the slots, and the outer ends of the radial grooves 23 in the face of the die cutter 8 and may correspond in number and in spacing to the number and spacing of the peripheral slots 20. The outlets in the discharge member 10, preferably do not correspond in number and spacing to the number and spacing of the grooves and constricted passageways in the die cutter 8, in order to prevent pulsing of the flow of the fluid through the outlets. By employing a member and spacing of the outlets different from the member and spacing of the constricted passageways and grooves, only part of the grooves and outlets are in register at the same time and pulsing of the flow of the fluid is prevented. This is particularly advantageous when the fluid is a liquid, e.g. water. The peripheral slots 20 and the ends of the grooves 23 are alternately brought in register with the outlets 25 as the die cutter is rotated about its axis with respect to the discharge member 10. The outlets in the discharge member 10 are suitably drill holes of a diameter about the same as the width of the peripheral slots 20 or smaller, and of a depth in the discharge member 10 corresponding to about their diameter, after which the outlets are advantageously enlarged to a greater diameter as shown in FIG. 7 to facilitate cooling and ejecting of the plastic material through the outlets 25. An inlet 26, suitably a threaded drill hole centrally located, is provided in the discharge member 10 for feed of fluid into the annular and radial grooves in the die cutter 8 when the discharge member 10 is positioned against the face of the die cutter 8.

In operation, a normally solid thermoplastic substance, e.g. polystyrene or a composition comprising polystyrene, in a heat-plastified or heat-softened flowable condition under pressure is advanced in the barrel 11 of the plastics extruder 12 by turning the screw 9 by means of a motor-driven gear (not shown). Steam, water, oil or other suitable heat-transfer medium is passed through chamber 14 to maintain or bring the plastic substance to a desired temperature. The plastic is advanced around the die cutter 8 and is pressed into the peripheral slots 20 and is maintained under a continuously applied pressure by action of the feed screw 9 turning in the barrel 11. Pressure of the plastic material against the die cutter 8, together with its slip-fit stud and socket connection with the end of the feed screw 9, causes the die cutter 8 to turn and permits its discharge face to rotate parallel with or against the adjacent face of the discharge member 10, thereby obviating the need for precise alignment between the two members.

A non-reacting fluid which is immiscible with the plastic such as nitrogen, propane, methyl alcohol, or water, is fed under pressure and at a temperature above its boiling point at atmospheric pressure into inlet 26 in the discharge member 10 from which it flows into the annular ring 24 and radial grooves 23 in the discharge face of die cutter 8 and between the adjacent faces of the die cutter 8 and the discharge member 10. As the die cutter 8 rotates, the peripheral slots 20 are brought in register with the outlets 25 in the discharge member 10. The plastic material under a continuously applied pressure in the peripheral slots 20 of the die cutter 8, extrudes into a zone of lower pressure in the outlets 25 when the peripheral slots 20 and the outlets 25 are in register and is cut into discrete segments or globules when the die cutter rotates so that the slots 20 and the outlets 25 are out of register. Upon continued turning of the die cutter 8, the ends of the grooves 23 in the face of the die cutter 8 are brought in register with the outlets 25 and the fluid under pressure is flowed into said outlets behind the globules of the plastic and simultaneously ejects the globules of the plastic substance into a zone of lower pressure, e.g. the atmosphere, and cools the plastic to the solid state. The extruded material is collected, in usual ways, e.g. by flowing the material into a cyclone-type collector, from which the polymer beads are separated from the gaseous material, or if water is employed as the fluid medium, the beads and liquid water are collected and separated by filtering, after which the polymer beads are dried.

The method can be employed for making beads of thermoplastic substances, i.e. organic plastics, such as cellulose ethers, cellulose esters and normally solid thermoplastic polymers and copolymers of vinyl and vinylidene compounds or compositions comprising such thermoplastic polymers and copolymers, e.g. plasticized or pigmented polymers and copolymers of vinyl and vinylidene compounds. The method is advantageously used for making beads of thermoplastic alkenyl aromatic resins and moldable compositions comprising the thermoplastic alkenyl aromatic resins having a small proportion of a plasticizer or one or more volatile organic compounds incorporated therewith, which volatile organic compound is capable of foaming the resin to form a cellular product upon heating of the beads of the composition to a temperature above its softening point and above the boiling point of the volatile organic compound.

By an alkenyl aromatic resin is meant a solid polymer of one or more polymerizable alkenyl aromatic compounds. Such polymer comprises in chemically combined form at least 50 percent by weight of at least one alkenyl aromatic compound having the general formula:

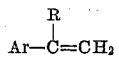

wherein Ar represents an aromatic hydrocarbon radical or a halohydrocarbon radical of the benzene series, and R is hydrogen or the methyl radical. Examples of such alkenyl aromatic resins are the solid homopolymers of styrene, vinyltoluene, vinylxylene, isopropylstyrene, tert-butylstyrene, ar-chlorostyrene, or ar-dichlorostyrene; the solid copolymers of two or more of such alkenyl aromatic compounds with one another; and solid copolymers of one or more of such alkenyl aromatic compounds with minor amounts of other readily copolymerizable olefinic compounds such as methyl methacrylate, or acrylonitrile; and copolymers of the monoalkenyl aromatic compounds with natural or a synthetic rubber, e.g. copolymers of styrene with from 2 to 15 percent by weight of a synthetic rubbery copolymer of butadiene and styrene.

The method herein described is particularly useful for making foamable beads of compositions comprising a thermoplastic alkenyl aromatic resin having a small proportion of a volatile organic compound incorporated therewith. Such compositions consist essentially of the alkenyl aromatic resin having from 0.05 to 0.3 gram molecular proportion of a volatile organic compound such as a saturated aliphatic hydrocarbon or a percholorofluorocarbon having a molecular weight of at least 58 and boiling at a temperature below 95° C., per 100 grams of the polymer, uniformly incorporated therewith and are normally solid materials at ordinary temperatures and pressures. Examples of suitable volatile organic compounds that can be incorporated under pressure with the alkenyl aromatic resins to form compositions which can be made into beads by the method of the invention are saturated aliphatic hydrocarbons such as butane, pentane, isopentane, neopentane, hexane, heptane or saturated aliphatic or cyclic perchlorofluorocarbons. Examples of suitable perchlorofluorocarbons are:

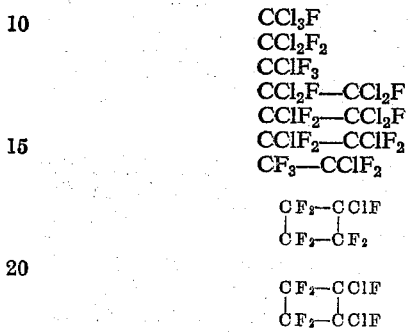

Mixtures of any two or more of such volatile organic compounds can also be used.

In practice a horizontal 3-inch standard plastics extruder had a barrel and screw 4 feet long. The screw was cut and its end was coaxially shaped to form a hexagonal stud adapted to slip-fit into the hexagonal socket 21 of the body 18 of a 1.5 inches long die member 8 similar to that shown in FIGS. 2, 3, 4 and 5. The body 18 of the die member had a 22½° slope to furnish a smooth approach for flow of plastic material into the peripheral slots 20 in the rim 19 of the die cutter 8. The rim 19 was 0.5 inch wide by 0.125 inch thick by 2.980 inches in diameter to provide running clearance of 0.010 inch between the rim and the bore of the barrel 11. The rim 19 contained 45 equally spaced peripheral slots 0.035 inch wide by 0.125 inch deep. On its face, the die cutter 8 contained 45 equally spaced radially disposed grooves 0.035 inch wide by 0.125 inch deep and 0.25 inch long. The grooves 23 extended between the peripheral slots 20 in the rim 19 and to within 0.09375 inch of the outer edge of the rim. The inner ends of the radially disposed grooves connected to an annular groove 24, of 2⅛ inches in diameter by 0.0625 inch wide by 0.0625 inch deep. A center core of the die cutter 8 had a diameter of 2 inches and was flush or level with the face of the die cutter. The die cutter 8 was fitted to the end of the feed screw 9 by slipping the hexagonal stud on the end of the screw into the corresponding socket 21 in the die cutter 8. The die cutter 8 was positioned in the barrel of the extruder adjacent to the discharge member 10 held in place across the end of the extruder 9 by bolts. The discharge member 10 consisted of a stainless steel plate 0.5 inch thick having a central inlet consisting of a drill hole therethrough, tapped with 0.25 inch U.S. Standard pipe threads. The discharge member 10 contained 50 outlets consisting of 0.035 diameter drill holes 0.035 inch deep in the plate 10 connecting with 0.125 inch diameter drill holes to form outlets therethrough as shown in FIG. 7. The outlets 25 were equally spaced on a circle of 2.625 inch diameter and were adapted to be alternately brought in register with the bottoms of the peripheral slots 20 in the rim 19 of the die cutter 8 and with the outer ends of the radially disposed grooves 23 in the face of the die cutter 8 as the die cutter was rotated with respect to the discharge member on plate 10.

The extruder is heated by passing steam, hot water, oil, or other heat transfer medium through chamber 14 whereby the plastic is brought to a heat-softened flowable condition at the desired temperature and is advanced in the barrel 11 by motion of the feed screw 9 (turned by a motor-driven gear not illustrated). The plastic is advanced into the constricted passageways, i.e. the peripheral slots 20, in the die cutter 8 and is maintained under a continuously applied pressure resulting from turning of the compression type feed screw 9. A non-reacting gaseous or liquid fluid, e.g. nitrogen, propane, helium, methyl alcohol or water, which is immiscible with the plastic is fed under pressure and at a temperature above its boiling point at atmospheric pressure into the inlet 26 in the discharge member 10 and into the grooves 23 and 24 in the die cutter 8. As the die cutter 8 rotates, the peripheral slots 20 are brought in register with the outlets 25 in the discharge member 10. The plastic material under pressure in the barrel of the extruder and in the slots in the rim of the die cutter advances into the outlets 10 and is cut into segments as the die cutter 8 rotates out of register with the outlets 10. Continued rotation of the die cutter 8 brings the grooves 23 in the face of the die cutter into register with the outlets 25 in the discharge member 10, whereby the fluid under pressure is flowed into the outlets behind the segments of the plastic and ejects the plastic material from the outlets and simultaneously cools it to the solid state as discrete beads.

It is important that the plastic material extruded into the outlets 25 be in an amount sufficient to fill or substantially fill the smallest cross-sectional area of said outlets prior to its being cut into discrete segments in order that beads of uniform or substantially uniform size are obtained. This can be accomplished by making the outlets in the form of round holes having a diameter less than, or not exceeding, the width of the slots or constricted passageways in the die cutter 8, or by turning the die cutter at a slower r.p.m. in order to provide a greater period for advance of the plastic through the slots into the outlets in the discharge member.

The specific apparatus, i.e. the die cutter 8 and the discharge member 10 in combination with the 3-inch extruder just described has been employed to make beads from a number of normally solid thermoplastic compositions comprising organic plastics as is more fully hereinafter described in the examples illustrating practice of the invention, but the examples are not to be construed as limiting the scope of the invention.

*Example 1*

Polystyrene, having a viscosity characteristic of 15 centipoises (determined for a 30 weight percent solution of the polystyrene in toluene at 25° C.), a molecular weight of about 23,000 as determined by the scattering of light and a second order transition temperature of 45° C., was fed to a nominal 3-inch plastics extruder having a barrel and feed screw 4 feet long which was fitted with an extrusion die comprising a die cutter 8 and a discharge member 10 having the dimensions previously described. The polystyrene was fed to the extruder at a rate of 40 pounds per hour and was heated therein to its melting point. The feed screw was turned at at rate of 61 revolutions per minute (r.p.m.) and advanced the molten polystyrene into the constricted passageways, i.e. the peripheral slots having a width of 0.035 inch in the die cutter. The heat-plastified polystyrene was maintained under a continuously applied pressure of 600 p.s.i. gauge pressure, at a temperature of 116° C. Water at a temperature of 109° C. and under a pressure of 200 p.s.i. gauge pressure was fed into the inlet 26 in the discharge member 10 at a rate of 350 pounds per hour. The heat-plastified polystyrene was intermittently extruded into the outlets and cut into segments and the water was alternately flowed into said outlets behind the segments of plastic, whereby the polystyrene and the water were discharged through the outlets into the atmosphere in the manner hereinbefore described. The product was collected in a cyclone-type apparatus. The polystyrene was separated from the water and was dried. The product was in the form of beads of substantially uniform size. A representative portion of the polystyrene beads was subjected to a screen analysis and was found to consist of beads of sizes as follows:

| U.S. standard screen Mesh size: | Weight percent of beads |
| --- | --- |
| 12 | 3.5 |
| 16 | 73.9 |
| 18 | 22.6 |
| | 100.0 |

The experiment was repeated, except that nitrogen gas was fed into the inlet 26 in the discharge member 10, under a pressure of 350 pounds per square inch to expel and cool the globules of the polystyrene. The product consisted of beads of substantially uniform sizes.

*Example 2*

A composition consisting of 94 percent by weight of polystyrene having a viscosity characteristic of 27 centipoises as determined for a 10 weight percent solution of the polystyrene in toluene at 25° C. and 6 percent by weight of n-pentane was extruded through the extrusion die in a manner similar to that described in Example 1. The feed screw of the extruder was turned at a rate of 80 r.p.m. The composition was heated and maintained under a continuously applied pressure of 1275 p.s.i. gauge pressure at a temperature of 145° C. and was extruded at a rate of 40 pounds of the composition per hour. Water at a temperature of 151° C. and under a pressure of 250 p.s.i. guage pressure was fed into the inlet in the discharge member at a rate of 675 pounds per hour. The composition was extruded into the atmosphere. The product was collected and dried. The composition was obtained as uniform small beads containing 5.7 percent by weight of n-pentane and having a bulk density of 36 pounds per cubic foot of the beads. The beads were of sizes as follows:

| U.S. standard screen Mesh size: | Weight percent of beads |
| --- | --- |
| 12 | 1.4 |
| 16 | 96.8 |
| 18 | 1.8 |
| | 100.0 |

Upon heating the beads in water at 100° C. they foamed to form a cellular mass having a bulk density of 0.8 pound per cubic foot of the foamed beads.

*Example 3*

A normally solid resinous composition was prepared by feeding molding grade polystyrene to a 3-inch plastics extruder fitted with an extrusion die comprising in combination a die cutter 8 and a discharge member 10 similar to those employed in Example 1. The polystyrene was heated to its melting point under pressure in the extruder and was mixed with n-pentane, fed to the extruder under pressure and into admixture with the molten polystyrene in amount sufficient to form a composition consisting of about 94 percent by weight of styrene and 6 percent of the n-pentane. The resulting mixture was blended under pressure in the extruder into a uniform composition and was advanced in the barrel by the feed screw and maintained under a continuously applied pressure of 1250 p.s.i. gauge pressure and at a temperature of 137° C. in the extrusion die. Water at a temperature of 166° C. and under a pressure of 300 p.s.i. gauge pressure was fed to the inlet 26 in the discharge member. The die cutter was rotated at 80 r.p.m. with resultant intermittent extruding of the polystyrene composition as discrete globules of the plastic at a rate of 42.5 pounds per hour and the flowing of the water at a rate of 350 pounds per hour, through the outlets into the atmosphere. The product was collected and was separated from the water and was dried. A portion of the product was subjected to a screen analysis and was found to consist of beads of sizes as follows:

| U.S. standard screens Mesh size: | Weight percent of beads |
|---|---|
| 10 | 1.8 |
| 12 | 4.0 |
| 14 | 17.4 |
| 16 | 71.6 |
| 18 | 5.2 |
| | 100.0 |

*Example 4*

A normally solid resinous composition consisting of molding grade polystyrene having 6 percent by weight of Skellysolve (B.P. 30°–60° C.) uniformly dispersed throughout was heat-plastified and intermittently extruded under a continuously applied pressure of 1300 p.s.i. at a temperature of 128° C., employing procedure and apparatus similar to that employed in Example 3. The extrusion die member was rotated at 80 r.p.m. with resultant extruding of the resinous composition as discrete globules at a rate of 42.5 pounds per hour. Water under a continuously applied pressure of 400 p.s.i. gauge pressure and at a temperature of 173° C. was alternately flowed through the outlets in the discharge member at a rate of 675 pounds per hour. The product was obtained as uniform solid beads of sizes as follows:

| U.S. standard screens mesh size: | percent by weight of beads |
|---|---|
| 10 | 0.6 |
| 12 | 1.6 |
| 14 | 7.0 |
| 16 | 62.8 |
| 18 | 27.4 |
| 20 | 0.6 |
| | 100.0 |

The product contained 5.9 percent by weight of the Skellysolve by analysis, and when heated in boiling water foamed to a cellular mass.

*Example 5*

Polyethylene having a melt index of 2 was fed at a rate of 30 pounds per hour to the 3-inch plastics extruder having the extrusion die previously described and was extruded in a manner similar to that described in Example 1. The screw was rotated at 80 r.p.m. and the heat-softened polyethylene was maintained under a continuously applied pressure of from 1550 to 1700 pounds per square inch and at temperatures between 176 and 182° C. in the barrel of the extruder at a point just ahead of the die cutter. Water at temperatures between 159° and 165° C. under a pressure of 250 p.s.i. gauge pressure was fed into the inlet in the discharge member at a rate of 500 pounds per hour. The polyethylene and the water were intermittently extruded into the atmosphere as the screw and die cutter were rotated. The product was collected and dried. The polyethylene was obtained as uniform small beads having a bulk density of 31 pounds per cubic foot of the beads. The beads were of sizes as follows:

| U.S. standard screen mesh size: | Weight percent of beads |
|---|---|
| 12 | 86 |
| 16 | 13.5 |
| 18 | 0.5 |
| | 100.0 |

*Example 6*

A composition consisting of 81 percent by weight of polyethylene having a melt index of 2 and 19 percent of dichlorotetrafluoroethane was prepared by procedure similar to that described in Example 3 and was maintained in the barrel of the extruder at a temperature of 120° C. under a continuously applied pressure of 1350 p.s.i. gauge pressure just ahead of the point of extrusion. The screw was rotated at 80 r.p.m. The composition was extruded at a rate of about 36 pounds per hour. Water at temperatures between 154° and 159° C. and under a pressure of 250 p.s.i. gauge pressure was fed at a rate of 500 pounds per hour into the inlet in the discharge member. The composition and the water were intermittently discharged into the atmosphere as the die cutter rotated. The product was collected and was dried. The product was obtained as partly foamed beads having a bulk density of 7 pounds per cubic foot of the beads. A porous mold was filled with the beads and heated in water at 100° C. for a period of one minute, then was cooled. The beads foamed and knitted together to form a cellular body conforming to the shape of the mold. The beads obtained from the extruder were of sizes as follows:

| U.S. standard screen mesh size: | Net percent of beads |
|---|---|
| 5 | 75 |
| 10 | 25 |
| | 100 |

*Example 7*

A composition consisting of 75 percent by weight of ethylcellulose and 25 percent by weight of bis(p-1,1,3,3-tetramethylbutyl-phenyl) ether as plasticizer was fed at a rate of 30 pounds per hour to the 3-inch plastics extruder and was extruded in a manner similar to that described in Example 1. The screw and die cutter were rotated at 104 r.p.m. The heat-softened composition was maintained under a continuously applied pressure of 1200 p.s.i. gauge pressure and at a temperature of about 156° C. in the barrel of the extruder at a point just ahead of the die cutter. Water at temperatures between 159° and 161° C. and under a pressure of 250 p.s.i. gauge pressure was fed into the inlet in the discharge member at a rate of 500 pounds per hour. The composition and the water were intermittently extruded into the atmosphere. The product was collected and dried. The composition was obtained as free flowing beads having a bulk density of 36 pounds per cubic foot of the beads.

We claim:

1. A method for making molding granules in the form of beads from a synthetic thermoplastic resin which comprises intermittently extruding a heat-plastified normally solid resinous composition comprising a synthetic thermoplastic polymer under a continuously applied pressure through a plurality of constricted passageways and a first valving means into a plurality of open outlets in a zone of lower pressure as discrete globules of said resinous composition and alternately flowing a non-reacting fluid which is immiscible with the plastic globules under a continuously applied pressure and at a temperature above its boiling point at atmospheric pressure into said outlets through channels opening in register with said outlets through a second valving means non-connecting with said constricted passageways, whereby the globules of the extruded plastic composition are ejected from said outlets and cooled to discrete solid beads.

2. A method as claimed in claim 1, wherein the synthetic thermoplastic polymer is a thermoplastic polymer comprising in chemically combined form at least 50 percent by weight of at least one alkenyl aromatic compound having the general formula:

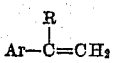

wherein Ar represents an aromatic radical of the group consisting of hydrocarbon and halohydrocarbon radicals of the benzene series and R is a member of the group consisting of hydrogen and the methyl radical.

3. A method as claimed in claim 1, wherein the synthetic thermoplastic polymer is a thermoplastic polymer containing in chemically combined form at least 50 percent by weight of at least one monovinyl aromatic hydrocarbon of the benzene series.

4. A method as claimed in claim 1, wherein the synthetic thermoplastic polymer is polystyrene.

5. A method for making foamable molding granules in the form of beads from a synthetic thermoplastic resin, which comprises intermittently extruding a heat-plastified normally solid resinous composition consisting essentially of a synthetic thermoplastic polymer having a volatile organic compound in which the polymer is insoluble uniformly dispersed throughout, under a continuously applied pressure at temperatures above the softening point of the composition and below the critical temperature of the volatile organic compound and such that the volatile organic compound is in non-gaseous form under the pressure thus applied to the composition, through a plurality of constricted passageways and a first valving means into a plurality of open outlets into a zone of lower pressure as discrete globules of the resinous composition and alternately flowing a non-reacting fluid which is immiscible with the plastic globules under a continuously applied pressure and at a temperature above the boiling point of the fluid at atmospheric pressure into said outlets through channels opening in register with said outlets through a second valving means non-connecting with said constricted passageways, whereby the globules of the extruded plastic composition are ejected from said outlets and cooled to discrete free-flowing foamable beads.

6. A method as claimed in claim 5, wherein the synthetic thermoplastic polymer is a thermoplastic polymer comprising in chemically combined form at least 50 percent by weight of at least one alkenyl aromatic compound having the general formula:

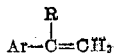

wherein Ar represents an aromatic radical of the group consisitng of hydrocarbon and halohydrocarbon radicals of the benzene series and R is a member of the group consisting of hydrogen and the methyl radical.

7. A method as claimed in claim 5, wherein the synthetic thermoplastic polymer is a thermoplastic polymer containing in chemically combined form at least 50 percent by weight of at least one monovinyl aromatic hydrocarbon of the benzene series.

8. A method as claimed in claim 5, wherein the volatile organic compound is at least one saturated aliphatic hydrocarbon having from 4 to 7 carbon atoms in the molecule and boiling at a temperature below 95° C. at 760 mm. absolute pressure.

9. A method for making molding granules in the form of beads from a synthetic thermoplastic resin, which comprises intermittently extruding a heat-plastified normally solid resinous composition consisting essentially of a thermoplastic polymer comprising in chemically combined form at least 50 percent by weight of at least one alkenyl aromatic compound having the general formula

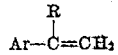

wherein Ar represents an aromatic radical of the group consisting of hydrocarbon and halohydrocarbon radicals of the benzene series and R is a member of the group consisting of hydrogen and the methyl radical, under a continuously applied pressure and at temperatures between about 140° C. and about 280° C., through a plurality of constricted passageways and a first valving means into a plurality of open outlets in a zone of lower pressure as discrete globules of the resinous composition and alternately flowing a non-reacting fluid which is immiscible with the plastic globules under a continuously applied pressure and at a temperature above the boiling point of the fluid at atmsopheric pressure into said outlets through channels opening in register with said outlets through a second valving means non-connecting with said constricted passageways, whereby the globules of the extruded plastic composition are ejected from said outlets and cooled to discrete free-flowing foamable beads.

10. A method as claimed in claim 9, wherein the alkenyl aromatic compound is styrene.

11. A method as claimed in claim 9, wherein the thermoplastic polymer is polystyrene.

12. A method for making foamable molding granules in the form of beads from a synthetic thermoplastic resin which comprises intermittently extruding a heat-plastified normally solid resinous composition consisting essentially of a thermoplastic polymer comprising in chemically combined form at least 50 percent by weight of at least one alkenyl aromatic compound having the general formula

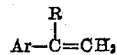

wherein Ar represents an aromatic radical of the group consisting of hydrocarbon and halohydrocarbon radicals of the benzene series and R is a member of the group consisting of hydrogen and the methyl radical, having uniformly incorporated therewith from 0.05 to 0.3 gram mole of a fluid foaming agent selected from the group consisting of saturated aliphatic hydrocarbons and perchlorofluorocarbons having a molecular weight of at least 58 and boiling at a temperature below 95° C. per 100 grams of the polymer, under a continuously applied pressure at temperatures between about 90° and 130° C. through a plurality of constricted passageways and a first valving means into a plurality of open outlets in a zone of lower pressure as discrete globules of the resinous composition and alternately flowing a non-reacting fluid which is immiscible with the plastic globules under a continuously applied pressure and at temperatures above the boiling point of the fluid at atmospheric pressure and below 200° C. into said outlets through channels opening in register with the outlets through a second valving means non-connecting with said constricted passageways, whereby the globules of the extruded plastic composition are ejected from said outlets and cooled to discrete free-flowing foamable beads.

13. A method as claimed in claim 12, wherein the alkenyl aromatic compound is styrene.

14. A method as claimed in claim 12, wherein the thermoplastic polymer is polystrene.

15. A method as claimed in claim 12, wherein the fluid-foaming agent is a perchlorofluorocarbon.

16. A method as claimed in claim 12, wherein the fluid-foaming agent is a saturated aliphatic hydrocarbon.

17. A method as claimed in claim 12, wherein the fluid foaming agent is predominantly a saturated aliphatic hydrocarbon containing 5 carbon atoms in the molecule.

18. A method as claimed in claim 12, wherein the non-reacting fluid is an aqueous fluid.

19. A method as claimed in claim 12, wherein the non-reacting fluid is predominantly water.

20. A method as claimed in claim 12, wherein the non-reacting fluid is a gas.

References Cited in the file of this patent

UNITED STATES PATENTS

| | | |
|---|---|---|
| 2,063,404 | Selman | Dec. 8, 1936 |
| 2,744,291 | Stastny et al. | May 8, 1956 |
| 2,813,299 | Mussey | Nov. 19, 1957 |
| 2,848,739 | Henning | Aug. 26, 1958 |